United States Patent [19]

Hioki

[11] 4,347,597
[45] Aug. 31, 1982

[54] AUTOMATIC TONE ARM RETURNING DEVICE

[75] Inventor: Shunkichi Hioki, Tokyo, Japan

[73] Assignee: Katoh Electrical Machinery Co., Ltd., Tokyo, Japan

[21] Appl. No.: 166,594

[22] Filed: Jul. 7, 1980

[30] Foreign Application Priority Data

Jul. 14, 1979 [JP] Japan .................................. 54-89694

[51] Int. Cl.³ ............................................ G11B 17/00
[52] U.S. Cl. ...................................... 369/231; 369/226
[58] Field of Search ............... 369/231, 232, 215, 225, 369/226, 230, 206, 178, 33, 233, 238; 250/231 SE

[56] References Cited

U.S. PATENT DOCUMENTS

| | | | |
|---|---|---|---|
| 2,405,526 | 8/1946 | Sinnett | 369/231 |
| 3,599,984 | 8/1971 | Kondo | 369/226 |
| 3,701,534 | 10/1972 | Laue | 369/226 |
| 4,145,608 | 3/1979 | Shirasaki et al. | 250/231 SE |
| 4,240,069 | 12/1980 | Hullein et al. | 250/231 SE |

FOREIGN PATENT DOCUMENTS 1182294 2/1970 United Kingdom .............. 369/231

Primary Examiner—John W. Shepperd
Attorney, Agent, or Firm—George B. Oujevolk

[57] ABSTRACT

An automatic tone arm returning device in a record player which comprises: pulse generator means for producing pulses whose cycle is proportional to the speed of the tone arm movement during record playing means for detecting the completion of record playing by measuring either the pulse width, the number of pulses produced in a unit of time, or the time interval between the pulses; and a Schmitt trigger circuit inserted between said two means and activated while the pulse is within a predetermined range of level; whereby the tone arm can be prevented from being return erroneously by the eccentric recorded grooves on record when the record is still being played.

4 Claims, 4 Drawing Figures

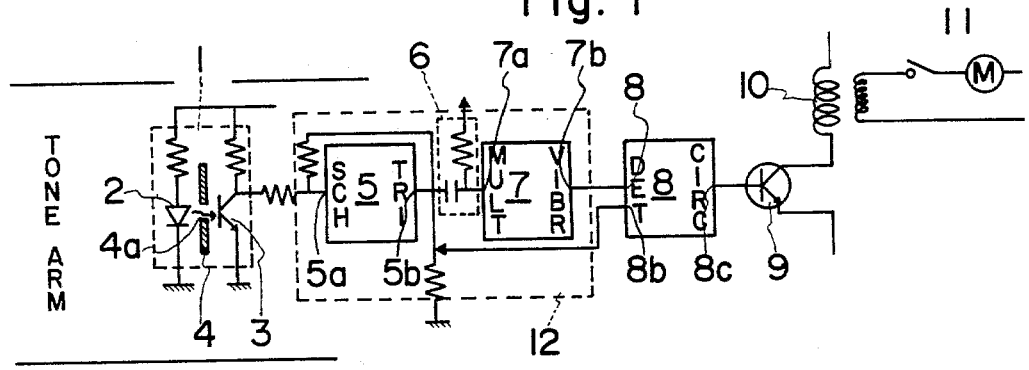
Fig. 1
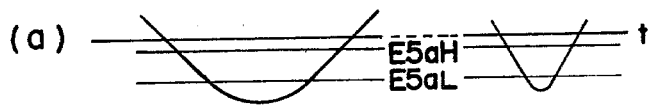
Fig. 2
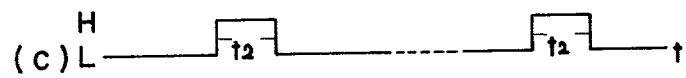
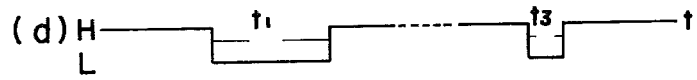
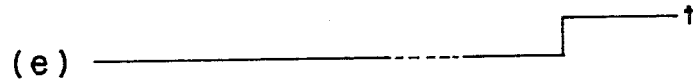

(a)

(b)

(c)

(d)

(e)

AUTOMATIC TONE ARM RETURNING DEVICE

BACKGROUND OF THE INVENTION

The present invention relates to an automatic tone arm returning device in a record player, having an electrical arrangement to prevent the erroneous return of the tone arm before coming to the lead-out groove of a record on the record player.

BRIEF DESCRIPTION OF THE PRIOR ART

The usual record used with a record player has a lead-out groove at the end of the last recorded groove on the record. This lead out groove is of a greater pitch than the other grooves on the record.

The conventional tone arm returning device usually has a shutter plate with a plurality of slits or small holes is fitted to the tone arm shaft and inserted between a light source and the photoelectric conversion element so that a light beam from the light source is blocked or allowed to pass through the slit of the shutter to the photoelectric conversion element as the tone arm moves during the record playing. This movement of the shutter by the tone arm produces pulses whose cycle is proportional to the speed of the tone arm movement which in turn is dependent on the pitch of the recorded grooves. The completion of the record playing is detected by sensing the lead out groove, either by measuring the time interval between pulses, counting the number of these pulses produced in a certain period of time, or measuring the width of the pulse, i.e., the time during which the photoelectric conversion element is receiving the light from the light source.

In this kind of device, however, if the recorded grooves are eccentric to the disc record, the tone arm will oscillate at the same cycle as the disc rotation, so that even when the pickup of the tone arm is running in the recorded grooves, the tone arm may move at a speed equal to or greater than the speed when it moves along the coarse-pitched lead-out groove. As a result, short-pitched pulses will be produced, causing the device to erroneously detect that the record playing is completed and return the tone arm.

In a device where the completion of record playing is detected by comparing the time width of the pulse as measured from the leading edge to the trailing edge with a reference pulse width, the drawback mentioned above may be alleviated to a certain degree by increasing the width of the slit of the shutter plate. However, there is a limit in this method because at least one pulse must be produced for every rotation of the record.

OBJECTS OF THE INVENTION

The object of this invention is to provide an automatic tone arm returning device of electrical construction in a record player which is capable of preventing an erroneous return operation of the tone arm as may be caused by the eccentric recorded grooves on the disc record.

The invention as well as other objects and advantages thereof will be more fully apparent from the following detailed description when taken together with the accompanying drawings, in which:

BRIEF DESCRIPTION OF THE DRAWINGS

FIG. 1 is a block diagram showing the circuit of the device of this invention;

FIGS. 2(a) through 2(e) are waveform diagrams showing the waveforms of signals produced when the disc record is played whose recorded grooves are not eccentric relative to the disc;

DETAILED DESCRIPTION

Figure 3:
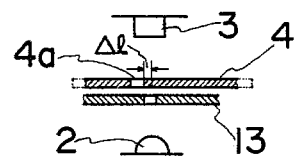
FIG. 3 is a simplified view of the pulse generator means showing the action of the means when the disc record is played whose recorded grooves are eccentric to the disc.

We will now explain an embodiment of the present invention in which the completion of record playing is detected by measuring the pulse width. Referring to FIG. 1, there is shown a photointerrupter 1 as a means to generate pulses. The photointerrupter 1 comprises a light source 2 such as a light emitting diode or a tungsten lamp, a photoelectric conversion element 3 such as a phototransistor, a photodiode and a Cds cell, and a shutter plate 4 inserted between the light source 2 and the photoelectric conversion element 3 and which has a plurality of slits 4a and moves with a tone arm shaft. A Schmitt trigger circuit 5 has an input side 5a connected to the output side of the photoelectric conversion element 3 contained in the photointerrupter 1. Connected to the output side of the Schmitt trigger circuit 5 is a differentiating circuit 6, to which a monostable multivibrator 7 is connected. These two circuit 6,7 make up a means 12 for measuring the pulse width. A comparator 8 is used for detecting the completion of record playing and comprises a NAND or AND enabling gating circuit connected to both the monostable multivibrator 7 and the Schmitt trigger circuit 5, through inputs 8a and 8b. A switching transistor 9 is connected to the comparator ouput 8c, i.e., to the record playing completion detection circuit 8. A" relay 10 is driven by the switching transistor 9; and a motor 11 is turned on and off by the relay 10 for automatically returning the tone arm.

As shown in FIG. 2(a), the Schmitt trigger circuit 5 has its upper trigger voltage set at sufficiently high level and its lower trigger voltage set at sufficiently low level so that it converts the sinusoidal wave signal sent from the photointerrupter 1 into the rectangular wave signal as shown in FIG. 2(b).

The action of these components will be explained using waveform diagrams. When the pickup on the tone arm is moving along the grooves on the record with no eccentricity, the photointerrupter produces the sine wave signal, as shown in FIG. 2(a), which is sent, either directly or after being amplified, to the input terminal 5a of the Schmitt trigger circuit 5. The Schmitt trigger circuit 5, according to the upper and lower trigger levels, converts the sine wave signal into the rectangular wave signal, as shown in FIG. 2(b), whose pulse width in terms of time is $t_1$ as measured from the trailing edge at E5aL to the leading edge at E5aH. This rectangular wave signal is applied, through the differentiating circuit 6, to the input terminal 7a of the monostable multivibrator 7 where it is further converted to the rectangular wave signal, as shown in FIG. 2(c), whose pulse width is $t_2$ measured from the leading edge to the trailing edge. The resultant signal is then supplied from the output terminal 7b to the input terminal 8a of the comparator 8.

To another input terminal 8b of the comparator 8 is supplied a rectangular wave signal shown in FIG. 2(d) from the output terminal 5b of the Schmitt trigger circuit 5, the signal having the same pulse width $t_1$ as that of FIG. 2(b). As will be noted from the comparison between the signals in (c) and (d), when the signal with the pulse width $t_2$ supplied to the input terminal 8a of the comparator 8 is high, the rectangular wave signal with the pulse width of $t_1$ applied to the other input terminal 8b goes low. As a result, the comparator 8 is not activated and the motor 11 is not operated.

When the pickup stylus of the tone arm begins to move along the lead-out groove on the disc record, the speed of the tone arm is accelerated because of the greater pitch of the lead-out groove with the result that the pitch of the sinusoidal wave produced by the photointerrupter 1 becomes smaller as shown at the right-hand side in FIG. 2(a). This signal with a reduced pitch is applied to the Schmitt trigger circuit 5 where it is converted into the rectangular wave signal, as shown at the right-hand side in FIG. 2(b), which has a smaller pulse width of $t_3$ as measured from the trailing edge to the leading edge. This signal is now supplied, through the differentiating circuit 6, to the monostable multivibrator 7 where it is further converted into another rectangular wave signal with the pulse width of $t_2$ which in turn is applied to the input terminal 8a of the comparator 8. At the same time, the rectangular wave signal as shown at the right in FIG. 2(d) having the same pulse width $t_3$ as that of the rectangular wave signal shown at the right in FIG. 2(b) is applied to the other input terminal 8a of the comparator 8. In this case, the signal with the pulse width of $t_3$ applied to the input terminal 8b goes high while the signal with the pulse width $t_2$ applied to the input terminal 8a is high. This drives the comparator 8 so as to produce an output from its output terminal 8c in the form of a trigger pulse shown at the right in FIG. 2(e) to turn on the switching transistor 9. As a result, the relay 10 is activated turning on the motor 11 and automatically returning the tone arm.

Figure 4:
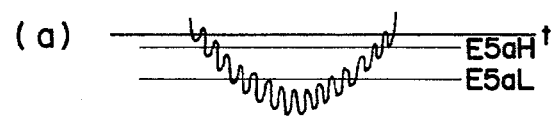
FIGS. 4(a) through 4(e) are waveform diagrams showing the waveforms of signals produced when the disc record is played whose recorded grooves are eccentric to the disc.
Figure 4:
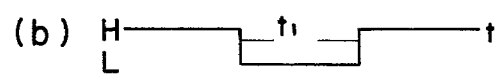
Figure 4:
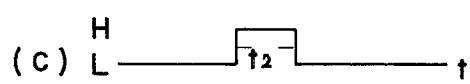
Figure 4:
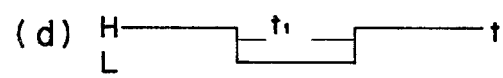
Figure 4:

If the record grooves are eccentric to the disc, the tone arm will undulate as the disc record rotates. This causes the shutter 4 to oscillate $\Delta l$ to the right and the left at the same cycle as the disc rotation, cutting the beam emitted from the light source 2 through the stationary slit plate 13. This movement causes the photointerrupter 1 to produce a sine wave signal with ripples or sine waves of smaller amplitude and pitch, as shown in FIG. 4(a), each smaller sine wave being produced as the slit 4a of the shutter 4 crosses the beam emitted through the slit plate 13.

The Schmitt trigger circuit 5 has its lower trigger voltage set at sufficiently low level of E5aL and the upper trigger voltage at sufficiently high level of E5aH so that the difference between the two set trigger voltages is sufficiently greater than the amplitude of the smaller sine waves or ripples. When the sine wave signal with ripples is applied to the Schmitt trigger circuit 5, the circuit produces a rectangular wave signal with a pulse width of $t_1$, as shown in FIG. 4(b), which goes low when the sine wave reaches the level of E5aL and goes high when it reaches the level of E5aH. The rectangular wave signal thus obtained is supplied, through the differentiating circuit 6, to the monostable multivibrator 7 where it is further converted into a rectangular wave signal with the pulse width of $t_2$, which is then applied to the input terminal 8a of the comparator 8. At the same time, a rectangular wave signal with the pulse width of $t_1$ as shown in FIG. 4(d) is applied to the other input terminal 8b. Because the rectangular wave signal applied to the input terminal 8b does not go high while the other rectangular wave signal to the other input terminal 8a is high, the comparator 8 is not activated thus preventing the tone arm from being return as a result of the undulation of the tone arm while the record is being played.

When the pickup of the tone arm begins to move along the eccentric lead-out groove, the speed of the tone arm movement becomes equal to or greater than that when it moves along the concentric lead-out groove, so that the motor 11 will be turned on returning the tone arm to the home position.

Although we have explained the system in which the photoelectric conversion element measures the time during which it receives the light through the slit and in which the time is compared with a predetermined time width to detect the completion of the record playing, this invention may also be applied to other systems, such as those in which the time interval between the light pulses is measured or the number of light pulses received during a certain period of time is counted.

While in the above embodiment we have used a photointerrupter as a means for producing pulses whose cycle is proportional to the speed of the tone arm movement, the pulse generating means may comprise a magnetic disc mounted on the tone arm shaft and having magnetic pulses recorded on its periphery, and a magnetic head for detecting the magnetic pulses.

What is claimed is:

1. In a record player with a tone arm, an automobile tone arm returning device having detecting means for detecting the lead out groove of a record being played by the record player, said tone arm returning device comprising:
   (a) pulse generator means with an output side for producing pulses whose cycle corresponds to the speed of the tone arm movement during the record playing;
   (b) a Schmitt trigger circuit with an input and an output side, the input side of the Schmitt trigger circuit being connected to the output side of the pulse generator means;
   (c) a one-shot multivibrator with an input side and an output side, with the multivibrator input side connected to the output side of the Schmitt trigger circuit;
   (d) a comparator detector with two enabling gates and one output gate, one each of the enabling gates being respectively connected to the output sides of the one-shot multivibrator and the Schmitt trigger circuit;
   (e) a switching transistor with a relay on the output side of the switching transistor, said switching transistor being operatively connected to the output side of the comparator detectors;
   (f) and, a motor operatively connected to the switching transistor through the relay to reset the tone arm, whereby, the position of the tone arm as being in the lead out groove is detected when an enabling signal is present at both enabling gates.

2. An automatic tone arm returning device as set forth in claim 1 wherein said pulse generator means comprises a shutter plate having a plurality of slits and moving with the tone arm, and a light source and a photoelectric conversion element, said plate and said conversion element being disposed on opposite sides of the shutter.

3. An automatic tone arm returning device as set forth in claim 1 wherein said comparator detector is a NAND circuit.

4. An automatic tone arm returning device as set forth in claim 1 wherein said comparator detector is an AND circuit.

* * * * *